July 5, 1932.  A. BROPHY  1,866,247
HOOK FOR DOORS
Filed Jan. 28, 1931
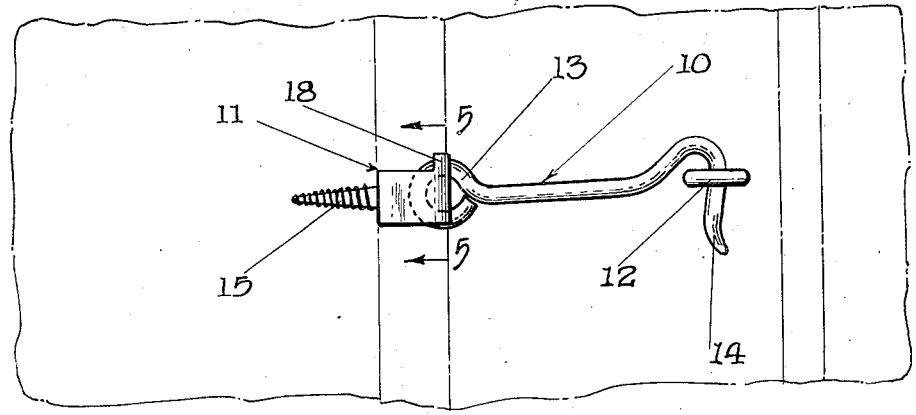
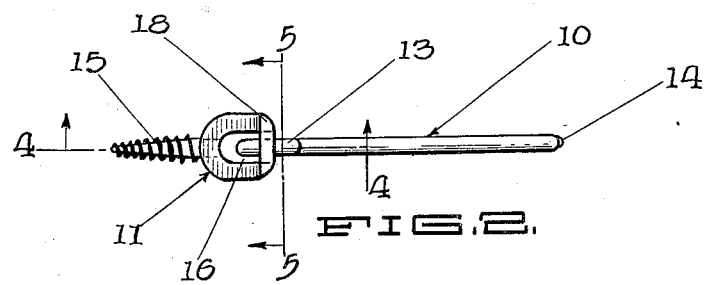
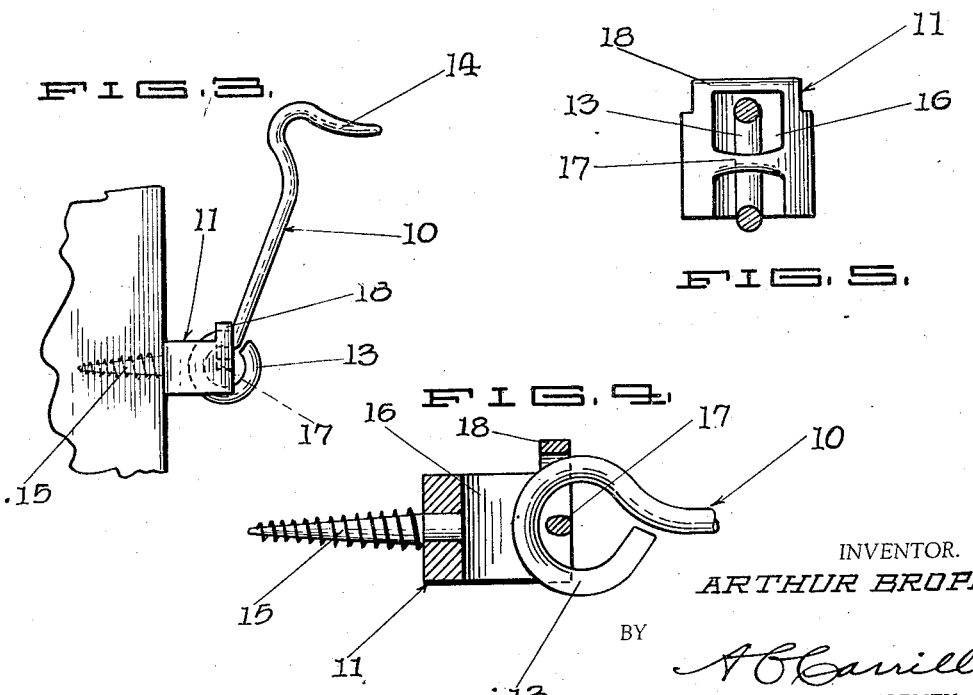
INVENTOR.
ARTHUR BROPHY,
BY
A. O. Carrillo
ATTORNEY.

Patented July 5, 1932

1,866,247

UNITED STATES PATENT OFFICE

ARTHUR BROPHY, OF SANTA CRUZ, CALIFORNIA

HOOK FOR DOORS

Application filed January 28, 1931. Serial No. 511,745.

The present invention relates generally to improvements in articles of hardware and more particularly to combined hooks and fastening means therefor and adapted for holding screen doors and like closures in closed position in their frames.

It is the primary object of the invention to provide a novel closure hook embodying as a part thereof a fastening member which is provided with a screw-shank adapting the fastener and hook to be securely fastened to screen doors or the like of any structure and embodying means for limiting the swinging movement of the hook relative to its fastener.

Another object of the invention is to provide a combined door hook and attaching member therefor which limits both the vertical swinging movement and lateral play of the hook shank relative to said member to prevent the hook from becoming jammed between the closure and the door frame.

Still another object of the invention is to provide a device of the class described which is simple in construction, efficient in operation, and that is cheap to manufacture.

Other objects and advantages of the invention will become apparent with reference to the subjoined specification and the accompanying sheet of drawing in which:

Figure 1 is a side elevation showing the hook and fastening means therefor as it appears on a closure in hooked position;

Figure 2 is a top plan view of the hook and the attaching member therefor per se;

Figure 3 is a side elevation showing the hook attaching member with the hook mounted therein and in raised position;

Figure 4 is a vertical sectional detail of the attaching member per se, as indicated by the line 4—4 in Figure 2; and Figure 5 is a front elevation of the attaching member per se showing the eye of the hook in section, the section being indicated by the line 5—5 in Figures 1 and 2.

Referring more particularly to the drawing in which the preferred form of the invention is illustrated my improved form of hook comprises the usual form of hook 10, attaching member 11 therefor, and retaining eyelet 12.

The hook 10 is of the usual form, as above described, and is provided at one end with an eye 13 and at its opposite end with a hook element 14 adapted to be inserted into the retaining eyelet 12 of the building structure.

The attaching member 11 consists of a die-cast member having a screw-shank 15 positioned in one end for attaching the member 11 to the door of the structure, said member being provided with a slot 16 and a crosspiece 17 which is encircled by the eye 13 of the hook 10.

A yoke 18 is formed at the front upper corner of the member 11 and this yoke forms a stop to limit the upward and rearward movement of the hook shank 10, as indicated in Figure 3.

The slot 16 in the member 11 is slightly wider than the diameter of the wire forming the eye 13 of the hook and limits the lateral movement of the hook shank relative to said member 11, as indicated in Figures 2 and 5, to prevent the hook shank from swinging laterally and becoming jammed between the door and the frame.

The novel features embodied in the invention include the combination of the usual door hook and the attaching member as disclosed, said member consisting of a small casting having a slot formed vertically therein and embodying the cross-bar 17, as hereinbefore described, for the reception and retention of the eye 13 of the hook, the yoke 18 thereof limiting the rearward movement of the hook shank and the slot 16 therein preventing too much lateral play of the hook shank.

In the above described manner the hook shank and hook are prevented from swinging laterally and the movement thereof is also limited vertically, thus holding the shank in position for use at all positions of the closure relative to the closure frame in which the eyelet 12 is secured.

What I claim and desire to secure by Letters Patent of the United States is the following:

A combined closure hook and attaching means therefor including a hook shank having an eye formed at one end, an attaching member therefor comprising a rectangular piece of metal having a vertical slot formed therein and a cross-bar connecting opposite sides of said walls and adapted to be encircled by said eye, a separate screw member inserted in the rear wall of said member, and a yoke formed above said cross-bar to limit the rearward swinging of said shank, said cross bar being disposed centrally of said member and below the yoke.

In testimony whereof I hereunto affix my signature.

ARTHUR BROPHY.